Patented Oct. 28, 1947

2,429,937

UNITED STATES PATENT OFFICE 2,429,937

TETRAACETYL RIBONIC ACID AND A PROCESS FOR ITS PREPARATION

Kurt Ladenburg, Princeton, Robert Babson, Elizabeth, and Max Tishler, Rahway, N. J., assignors to Merck & Co., Inc., Rahway, N. J., a corporation of New Jersey No Drawing. Application October 1, 1942, Serial No. 460,352

4 Claims. (Cl. 260—488)

This invention relates generally to improvements in processes for preparing organic chemical compounds and in a more particular sense is concerned with a method for preparing tetraacylribonic acids, substances which are useful in the synthesis of riboflavin.

Ribonic acid (Formula A below) exhibits a very marked tendency to form the lactone (Formula B below) particularly in acidic media and accordingly, when treating the acid by usual processes of synthesis in an attempt to obtain the tetraacyl derivative (Formula C below) the desired product is contaminated with relatively large quantities of the triacyl lactone (Formula D below) which is stable in acidic media.

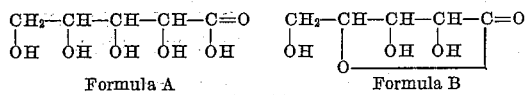

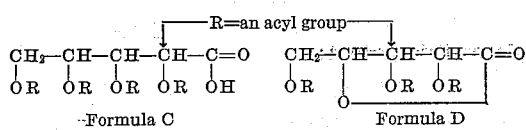

To avoid this loss in yield of the desired product due to formation of the acylated lactone, involved and costly procedures have been devised which under favorable conditions, have given as much as 65% yields. For example, in one prior art process, ribonic acid is converted to the lactone, then to the amide derivative, acylated and changed to the acid.

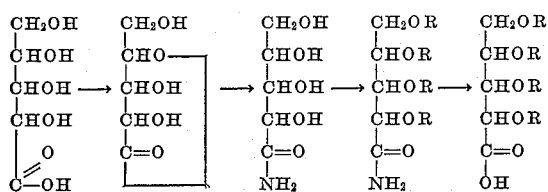

This process, by comparison to the process according to this invention, is less satisfactory because of relatively low yields, necessity of passing through several intermediates, and time required. Another prior art process is based upon the following conversions:

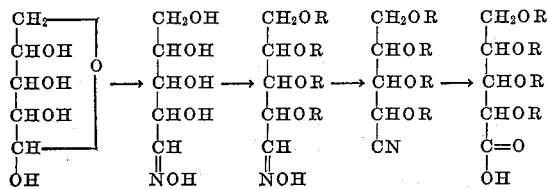

This process is subject to the same criticisms as the first described process and additionally, the reagents required are expensive.

The present invention is concerned with a novel process for the preparation of acyl derivatives of ribonic acid wherein high yields of the tetraacyl compound are obtained to the substantial exclusion of the triacyl lactone compound. In accordance with this invention, a salt of ribonic acid is treated with an acid anhydric at somewhat below room temperature in the presence of gaseous hydrogen chloride until absorption of the hydrogen chloride by the mixture substantially ceases. Among the salts of ribonic acid that have been found suitable for use in the practice of the present invention are the cadmium, zinc, calcium, potassium, ammonium, and barium salts, of which the cadmium salt is presently preferred because its use results in larger yields of the desired product. Acetic anhydride is the presently preferred acid anhydride. Inasmuch as acetic anhydride reacts with gaseous hydrogen chloride to produce acetyl chloride, the process can be practiced to obtain satisfactory yields by use of acetyl chloride, replacing wholly or partially the hydrogen chloride above mentioned. The use of the acid anhydride and gaseous hydrogen chloride is preferred however as it permits adjustment of the reaction temperature, and accordingly of the rate of reaction, by control of hydrogen chloride addition. Although under certain conditions higher reaction temperatures may be desirable, it is preferred to perform the reaction somewhat below room temperature, say about 10° C., as otherwise the reaction proceeds with considerable violence.

The following examples illustrate the methods of carrying out the present invention but it is to be understood that these examples are given by way of illustration and not of limitation.

Example I

About 20 g. of dry cadmium ribonate and approximately 100 cc. of acetic anhydride are mixed and cooled to about 10° C., then gaseous hydrogen chloride is passed into the mixture at a rate such that the temperature of the mixture remains less than about 15° C. When hydrogen chloride absorption has ceased, which usually occurs after about one hour, the mixture is heated to about 50° C. and maintained at this temperature for approximately one hour, thereby completing the reaction and causing evolution of excess hydrogen chloride. After removal of precipitated cadmium chloride by filtration, the filtrate is evaporated to dryness, yielding tetraacetylribonic acid in the form of white crystals melting at about 136°–139° C. Upon recrystallization of the product from acetic acid, a material melting at 139°–140° C. is obtained. Yield, 85% of theoretical.

*Example 2*

Gaseous hydrogen chloride is passed into a mixture of about 20 g. of calcium ribonate and approximately 100 cc. of acetic anhydride for about one and one half hours, during which the temperature is permitted to rise to approximately 50° C. The solution is then reduced to dryness in vacuo, extracted with hot benzene, filtered, reduced to dryness in vacuo and the residue, tetraacetylribonic acid is crystallized from acetic acid. M. P. 133–137° C.

*Example 3*

Gaseous hydrogen chloride is passed into a mixture of about 20 g. of ammonium ribonate and approximately 150 cc. of acetic anhydride for about one hour at 5–10° C. and for a half hour at about 25° C., after which the mixture is heated at approximately 50° C. for about 2 hours, filtered and reduced to dryness. The product thus obtained is crystallized from acetic acid. M. P. 135–137° C.

*Example 4*

Gaseous hydrogen chloride is passed into a mixture of about 20 g. of potassium ribonate and approximately 110 cc. of acetic anhydride at 10° C. for about two hours, then the mixture is filtered, reduced to dryness and the residue is crystallized from acetic acid. Tetraacetylribonic acid, M. P. 133–137° C.

*Example 5*

A mixture of about 10 g. of barium ribonate and approximately 75 cc. of acetic anhydride is treated with gaseous hydrogen chloride for about one hour at 5–7° C. and additionally at about 15° C. for one and one half hours. After filtering, reducing to dryness and crystallizing from alcohol, tetraacetylribonic acid is obtained, M. P. 138–140° C.

Modifications may be made in the process above described as will be obvious to those versed in the art. For example, it has been found that acetyl chloride can be used as an acetylating agent, although it is not preferred to do so, as the reaction proceeds more smoothly when acetic anhydride and gaseous hydrogen chloride, with or without addition of acetyl chloride, are used. The use of acetic anhydride and hydrogen chloride possesses the advantage that the temperature of the reaction mixture can be controlled by altering the rate of addition of the hydrogen chloride.

Modifications may be made in carrying out the present invention without departing from the spirit and scope thereof and the invention is to be limited only by the appended claims.

What is claimed is:

1. The process of preparing tetraacetyl ribonic acid, which comprises reacting, at a temperature somewhat below room temperature, a salt of ribonic acid and acetic anhydride, said reaction being carried out in the presence of gaseous hydrogen halide.

2. The process of preparing tetraacetyl ribonic acid, which comprises reacting, at a temperature of about 10° C., cadmium ribonate and acetic anhydride, said reaction being carried out in the presence of gaseous hydrogen chloride.

3. The process of preparing tetraacetyl ribonic acid, which comprises reacting, at a temperature of about 10° C., ammonium ribonate and acetic anhydride, said reaction being carried out in the presence of gaseous hydrogen chloride.

4. The process of preparing tetraacetyl ribonic acid, which comprises reacting, at a temperature of about 10° C., zinc ribonate and acetic anhydride, said reaction being carried out in the presence of gaseous hydrogen chloride.

KURT LADENBURG.
ROBERT BABSON.
MAX TISHLER.

REFERENCES CITED

The following references are of record in the file of this patent:

UNITED STATES PATENTS

| Number | Name | Date |
|---|---|---|
| 2,198,628 | Major et al. | Apr. 30, 1940 |
| 2,237,263 | Pasternack et al. | Apr. 1, 1941 |

OTHER REFERENCES

Woolley, "Jour. Am. Chem. Soc.," vol. 62 (1940), pp. 2251–2252.

Robbins et al., "Jour. Am. Chem. Soc.," vol. 62 (1940), pp. 1074–1075.